(12) United States Patent
Bächer et al.

(10) Patent No.: US 10,399,327 B2
(45) Date of Patent: Sep. 3, 2019

(54) DESIGNING CUSTOMIZED DEFORMABLE INPUT DEVICES USING SIMULATED PIEZOELECTRIC SENSOR RESPONSES

(71) Applicant: Disney Enterprises, Inc., Burbank, CA (US)

(72) Inventors: Moritz Niklaus Bächer, Zurich (CH); Benjamin Hepp, Zurich (CH); Fabrizio Pece, Zurich (CH); Paul Gregory Kry, Quebec (CA); Bernd Bickel, Vienna (AT); Bernhard Steffen Thomaszewski, Zurich (CH); Otmar Hilliges, Zurich (CH)

(73) Assignees: Disney Enterprises, Inc., Burbank, CA (US); ETH Zurich (Eidgenoessische Technische Hochschule Zurich, Zurich (CH)

( * ) Notice: Subject to any disclaimer, the term of this patent is extended or adjusted under 35 U.S.C. 154(b) by 479 days.

(21) Appl. No.: 15/135,955

(22) Filed: Apr. 22, 2016

(65) Prior Publication Data
US 2017/0308061 A1    Oct. 26, 2017

(51) Int. Cl.
*G05B 19/4099* (2006.01)
*B33Y 80/00* (2015.01)
(Continued)

(52) U.S. Cl.
CPC ............ *B33Y 80/00* (2014.12); *B29C 64/118* (2017.08); *B29C 64/386* (2017.08);
(Continued)

(58) Field of Classification Search
None
See application file for complete search history.

(56) References Cited

U.S. PATENT DOCUMENTS

2017/0185165 A1\* 6/2017 Clambaneva ............ G06F 3/03
2017/0186165 A1\* 6/2017 Taylor ................... G06T 17/205
(Continued)

OTHER PUBLICATIONS

Rendl et al. 'FlexSense: A Transparent Self-Sensing Deformable Surface' UIST '14 Proceedings of the 27th annual ACM symposium on User interface software and technology pp. 129-138 (2014).\*
(Continued)

*Primary Examiner* — Bernard G Lindsay
(74) *Attorney, Agent, or Firm* — Patterson + Sheridan, LLP

(57) ABSTRACT

Embodiments herein describe deformable controllers that rely on piezoelectric material embedded in the controllers to detect when the input device is being manipulated into a particular deformation or gesture. The computing system may perform different actions depending on which deformation is detected. The embodiments herein describe design techniques for optimizing the placement of the piezoelectric material in the controller to improve the accuracy of a mapping function that maps sensor responses of the material to different controller deformations. In one embodiment, the user specifies the different deformations of the controller she wishes to be recognized by the computing system (e.g., raising a leg, twisting a torso, squeezing a hand, etc.). The design optimizer uses the locations of the desired deformations to move the location of the piezoelectric material such that the sensor response of the material can be uniquely mapped to these locations.

14 Claims, 5 Drawing Sheets

(51) Int. Cl.
| | |
|---|---|
| *B33Y 70/00* | (2015.01) |
| *B33Y 50/02* | (2015.01) |
| *B33Y 10/00* | (2015.01) |
| *B33Y 50/00* | (2015.01) |
| *B29C 64/393* | (2017.01) |
| *B29C 64/118* | (2017.01) |
| *B29C 64/386* | (2017.01) |
| *B29L 31/34* | (2006.01) |

(52) U.S. Cl.
CPC ............ *B29C 64/393* (2017.08); *B33Y 10/00* (2014.12); *B33Y 50/00* (2014.12); *B33Y 50/02* (2014.12); *B33Y 70/00* (2014.12); *B29C 2995/0003* (2013.01); *B29L 2031/3406* (2013.01)

(56) References Cited

U.S. PATENT DOCUMENTS

2017/0300598 A1* 10/2017 Akavia .................. G06Q 50/04
2017/0319132 A1* 11/2017 Longinotti-Buitoni ......................
A61B 5/0002

OTHER PUBLICATIONS

Lin et al. 'Pencil Drawn Strain Gauges and Chemiresistors on Paper' Scientific Reports vol. 4, Article No. 3812 (2014).*
Chien et al. 'Flexi Bend: Enabling Interactivity of Multi-Part, Deformable Fabrications Using Single Shape-Sensing Strip' ACM User Interface Software and Technology Symposium (ACM UIST 2015).*
Gilles Bailly and Antti Oulasvirta. 2014. Toward Optimal Menu Design. interactions 21, 4 (Jul. 2014), 40-45.
Gilles Bailly, Antti Oulasvirta, Timo Kotzing, and Sabrina Hoppe. 2013. MenuOptimizer: Interactive Optimization of Menu Systems. In Proceedings of the 26th Annual ACM Symposium on User Interface Software and Technology (UIST '13). ACM, New York, NY, USA, 331-342.
Ravin Balakrishnan, George Fitzmaurice, Gordon Kurtenbach, and Karan Singh. 1999. Exploring Interactive Curve and Surface Manipulation Using a Bend and Twist Sensitive Input Strip. In Proceedings of the 1999 Symposium on Interactive 3D Graphics (I3D '99). ACM, New York, NY, USA, 111-118.
Bernd Bickel, Moritz Bacher, Miguel A. Otaduy, Hyunho Richard Lee, Hanspeter Pfister, Markus Gross, and Wojciech Matusik. 2010. Design and Fabrication of Materials with Desired Deformation Behavior. ACM Trans. on Graphics (Proc. SIGGRAPH) 29, 3 (2010).
Eric Brockmeyer, Ivan Poupyrev, and Scott Hudson. 2013. PAPILLON: designing curved display surfaces with printed optics. In Proceedings of the 26th annual ACM symposium on User interface software and technology—UIST '13 ACM Press, New York, New York, USA, 457-462.
Lee A. Danisch, Kevin Englehart, and Andrew Trivett. 1999. Spatially continuous six-degrees-of-freedom position and orientation sensor. (1999). [Abstract Only].
Nan-Wei Gong, Jurgen Steimle, Simon Olberding, Steve Hodges, Nicholas Edward Gillian, Yoshihiro Kawahara, and Joseph A. Paradiso. 2014. PrintSense: a versatile sensing technique to support multimodal flexible surface interaction. In Proceedings of ACM conference on Human factors in computing systems—ACM CHI. ACM Press, New York, New York, USA, 1407-1410.
Fenner Drives Inc. Accessed: Aug. 7, 2015. Fenner Drives Inc. NinjaFlex filament. http://www.ninjaflex3d.com. (Accessed: Aug. 7, 2015).
MakerBot Industries. Accessed: Aug. 5, 2015. MakerBot Replicator 2X. https://eu.makerbot.com/shop/de/ 3d-drucker/replicator-2x. (Accessed: Aug. 5, 2015).
Alec Jacobson, Daniele Panozzo, Oliver Glauser, C'edric Pradalier, Otmar Hilliges, and Olga Sorkine-Hornung. 2014. Tangible and Modular Input Device for Character Articulation. ACM Trans. Graph. 33, 4, Article 82 (Jul. 2014), 12 pages.
Amit Joe Lopes, Eric MacDonald, and Ryan B. Wicker. 2012. Integrating stereolithography and direct print technologies for 3D structural electronics fabrication. Rapid Prototyping Journal 18, 2 (Mar. 2012), 129-143.
Wolfgang Kabsch. 1976. A solution for the best rotation to relate two sets of vectors. Acta Crystallographica Section A: Crystal Physics, Diffraction, Theoretical and General Crystallography 32, 5 (1976), 922-923.
Andreas Karrenbauer and Antti Oulasvirta. 2014. Improvements to Keyboard Optimization with Integer Programming. In Proceedings of the 27th Annual ACM Symposium on User Interface Software and Technology (UIST '14). ACM, New York, NY, USA, 621-626.
T. Kato, A. Yamamoto, and T. Higuchi. 2003. Shape recognition using piezoelectric thin films. In Industrial Technology, 2003 IEEE International Conference on, vol. 1. 112-116 vol. 1. [Abstract Only].
S. J. Leigh, R. J. Bradley, C. P. Purssell, D. R. Billson, and D. A. Hutchins. 2012. A Simple, Low-Cost Conductive Composite Material for 3D Printing of Electronic Sensors. PLoS ONE 7, 11 (2012).
M Melnykowycz, B Koll, D Scharf, and F. Clemens. 2014. Comparison of Piezoresistive Monofilament Polymer Sensors. Sensors 14, 1 (2014), 1278-1294.
Joseph T Muth, Daniel M Vogt, Ryan L Truby, Yi?git Menguc,, David B Kolesky, Robert J Wood, and Jennifer A Lewis. 2014. Embedded 3D Printing of Strain Sensors within Highly Stretchable Elastomers. Advanced Materials 26, 36 (2014), 6307-6312.
Simon Olberding, Michael Wessely, and Jurgen Steimle. 2014. PrintScreen: Fabricating Highly Customizable Thin-film Touch-Displays. In Proceedings of the 27th annual ACM symposium on User interface software and technology—UIST 14. ACM Press, New York, New York, USA, 281-290.
Huaishu Peng, Jennifer Mankoff, Scott E. Hudson, and James McCann. 2015. A Layered Fabric 3D Printer for Soft Interactive Objects. In Proceedings of the 33rd Annual ACM Conference on Human Factors in Computing Systems (CHI '15). ACM, New York, NY, USA, 1789-1798.
Thiago Pereira, Szymon Rusinkiewicz, and Wojciech Matusik. 2014. Computational Light Routing: 3D Printed Optical Fibers for Sensing and Display. ACM Transactions on Graphics 33, 3 (Jun. 2014), 1-13.
3D Prima. Accessed: Aug. 3, 2015. 3D Prima Conductive ABS. http://www.3dprima.com/en/ filaments-for-3d-printers/abs-175mm/ 3d-prima-conductive-abs-175mm-1-kg-spool-black.html. (Accessed: Aug. 3, 2015).
Recreus. Accessed: Aug. 7, 2015. Recreus Filaflex filament.http://recreus.com/en/4filaflex-filaments. (Accessed: Aug. 7, 2015).
Christian Rendl, Patrick Greindl, Michael Haller, Martin Zirkl, Barbara Stadlober, and Paul Hartmann. 2012. PyzoFlex: printed piezoelectric pressure sensing foil. In Proceedings of the 25th annual ACM symposium on User interface software and technology—UIST '12. ACM Press, New York, New York, USA, 509. [Abstract Only].
Christian Rendl, David Kim, Sean Fanello, Patrick Parzer, Christoph Rhemann, Jonathan Taylor, Martin Zirkl, Gregor Scheipl, Thomas Rothlander, Michael Haller, and Shahram Izadi. 2014. FlexSense: A Transparent Self-sensing Deformable Surface. In Proceedings of the 27th Annual ACM Symposium on User Interface Software and Technology (UIST '14). 129-138 [Abstract Only].
Valkyrie Savage, Andrew Head, Bjorn Hartmann, Dan B. Goldman, Gautham Mysore, and Wilmot Li. 2015. Lamello: Passive Acoustic Sensing for Tangible Input Components. In Proceedings of the 33rd Annual ACM Conference on Human Factors in Computing Systems—CHI '15. ACM Press, New York, New York, USA, 1277-1280. [Abstract Only].
Valkyrie Savage, Ryan Schmidt, Tovi Grossman, George Fitzmaurice, and Bjorn Hartmann. 2014. A Series of Tubes: Adding Interactivity to 3D Prints Using Internal Pipes. In Proceedings of the 27th Annual ACM Symposium on User Interface Software and Technology (UIST '14). 3-12.
Carsten Schwesig, Ivan Poupyrev, and Eijiro Mori. 2004. Gummi: A Bendable Computer. In Proceedings of the SIGCHI Conference

(56) References Cited

OTHER PUBLICATIONS on Human Factors in Computing Systems (CHI '04). ACM, New York, NY, USA, 263-270. [Abstract Only].

M'elina Skouras, Bernhard Thomaszewski, Stelian Coros, Bernd Bickel, and Markus Gross. 2013. Computational Design of Actuated Deformable Characters. ACM Trans. Graph. 32, 4, Article 82 (Jul. 2013), 10 pages [Abstract Only].

Ronit Slyper, Ivan Poupyrev, and Jessica Hodgins. 2011. Sensing through structure: designing soft silicone sensors. In Proceedings of the fifth international conference on Tangible, embedded, and embodied interaction. ACM, 213-220.

Brian A. Smith, Xiaojun Bi, and Shumin Zhai. 2015. Optimizing Touchscreen Keyboards for Gesture Typing. In Proceedings of the 33rd Annual ACM Conference on Human Factors in Computing Systems (CHI '15). ACM, New York, NY, USA, 3365-3374.

Olga Sorkine and Marc Alexa. 2007. As-rigid-as-possible surface modeling. In Symposium on Geometry processing, vol. 4.

Srinath Sridhar, Anna Maria Feit, Christian Theobalt, and Antti Oulasvirta. 2015. Investigating the Dexterity of Multi-Finger Input for Mid-Air Text Entry. In Proceedings of the 33rd Annual ACM Conference on Human Factors in Computing Systems (CHI '15). ACM, New York, NY, USA, 3643-3652. [Abstract Only].

Turgen Steimle, Andreas Jordt, and Pattie Maes. 2013. Flexpad: Highly Flexible Bending Interactions for Projected Handheld Displays. In Proceedings of the SIGCHI Conference on Human Factors in Computing Systems (CHI '13). ACM, New York, NY, USA, 237-246. [Abstract Only].

Stratasys. Accessed: Sep. 25, 2015. Objet Connex 3D Printers. http://www.stratasys.com/3d-printers/ design-series/ connex-systems. (Accessed:Sep. 25, 2015).

Creative Tools. Accessed: Aug. 3, 2015. Palmiga conductive TPU. http://www.creativetools.se/ pi-etpu-95-250-carbon-black-1kg-se. (Accessed:Aug. 3, 2015).

Marynel V'azquez, Eric Brockmeyer, Ruta Desai, Chris Harrison, and Scott E. Hudson. 2015. 3D Printing Pneumatic Device Controls with Variable Activation Force Capabilities. In Proceedings of the 33rd Annual ACM Conference on Human Factors in Computing Systems (CHI '15). ACM, New York, NY, USA, 1295-1304 [Abstract Only].

Karl Willis, Eric Brockmeyer, Scott Hudson, and Ivan Poupyrev. 2012. Printed optics: 3D Printing of Embedded Optical Elements for Interactive Devices. In Proceedings of the 25th annual ACM symposium on User interface software and technology—UIST '12. ACM Press, New York, New York, USA, 589-598. [Abstract Only].

Martin Zirkl, Anurak Sawatdee, Uta Helbig, Markus Krause, Gregor Scheipl, Elke Kraker, Peter Andersson Ersman, David Nilsson, Duncan Platt, Peter Bodo, Siegfried Bauer, Gerhard Domann, and Barbara Stadlober. 2011. An all-printed ferroelectric active matrix sensor network based on only five functional materials forming a touchless control interface. Advanced materials (Deerfield Beach, Fla.) 23, 18 (May 2011), 2069-74 [Abstract Only].

\* cited by examiner

DESIGNING CUSTOMIZED DEFORMABLE INPUT DEVICES USING SIMULATED PIEZOELECTRIC SENSOR RESPONSES

BACKGROUND

Field of the Invention

The embodiments herein are generally directed to designing 3D objects to be used as input devices for a computing system.

Description of the Related Art

Consumer 3D printers are becoming increasingly powerful and sophisticated, enabling user to create tangible objects with custom shape and appearance. In particular, multi-material 3D printers can fabricate objects with spatially-varying mechanical properties that deform in desired ways.

A user can use the 3D printed object as an input device to control a computing system. Sensors attached to the object by the user provide signals to the computing system for determining the particular deformation or manipulation of the object. For example, raising the arm of the 3D object may cause a visual representation of the object displayed on a monitor to also raise its arm. In this manner, the user can create customizable 3D input objects which can be used to interact with a computing system.

SUMMARY

One embodiment described herein is a method that includes receiving a design of a deformable controller and identifying a desired deformation of the controller where at least a portion of the controller changes from a first pose to a second pose. The method includes determining an initial path of piezoelectric material in the design of the controller and adjusting, using one or more computing processors, the path of the piezoelectric material in the design based on comparing a goal location of the portion of the controller when performing the desired deformation to a calculated location of the portion of the controller derived using a simulated sensor response of the piezoelectric material.

Another embodiment described herein is a non-transitory computer-readable storage medium for designing a deformable controller. The computer-readable storage medium includes program code operable to receive a design of a deformable controller and identify a desired deformation of the controller where at least a portion of the controller changes from a first pose to a second pose. The program code is operable to determine an initial path of piezoelectric material in the design of the controller and adjust, using one or more computing processors, the path of the piezoelectric material in the design based on comparing a goal location of the portion of the controller when performing the desired deformation to a calculated location of the portion of the controller derived using a simulated sensor response of the piezoelectric material.

Another embodiment described herein is a computing system that includes one or more computing processors and memory storing a program, wherein the program, when executed using the one or more processors, performs an operation that includes receiving a design of a deformable controller and identifying a desired deformation of the controller where at least a portion of the controller changes from a first pose to a second pose. The operation also includes determining an initial path of piezoelectric material in the design of the controller and adjusting, using one or more computing processors, the path of the piezoelectric material in the design based on comparing a goal location of the portion of the controller when performing the desired deformation to a calculated location of the portion of the controller derived using a simulated sensor response of the piezoelectric material.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
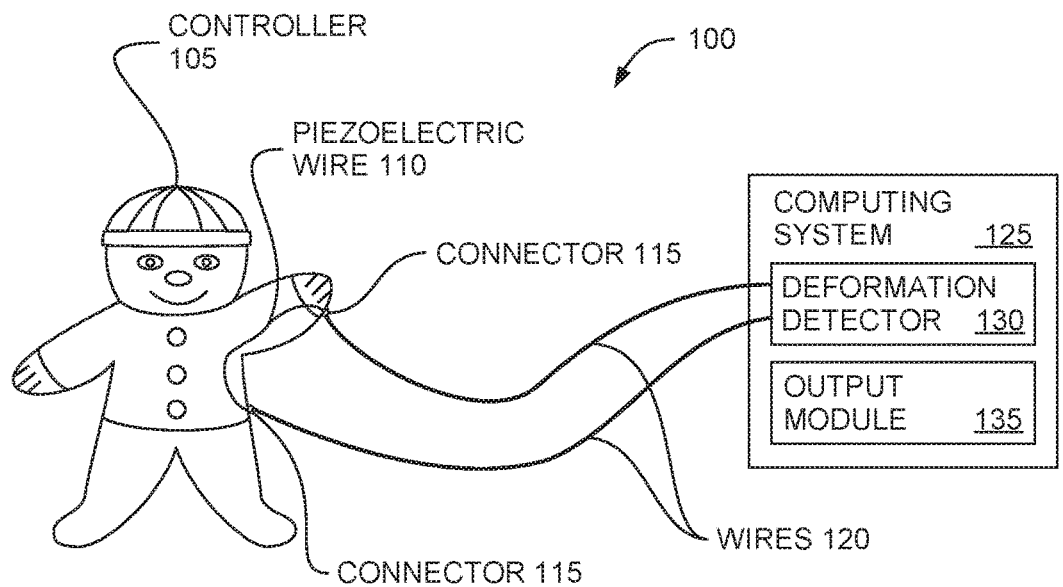
FIGS. 1A and 1B illustrate an input system that includes a deformable 3D controller, according to embodiments described herein.

Embodiments herein describe deformable 3D input devices (referred to herein as controllers) that rely on piezoelectric material embedded in the controllers to detect when the controller is being manipulated into a particular deformation or gesture. For example, the piezoelectric material may be a piezoelectric wire that is embedded in the controller such that deforming the controller changes the physical characteristics of the wire—e.g., stretches or compresses the wire. This change in the physical characteristics of the piezoelectric wire causes corresponding changes in the electrical characteristics of the wire such as its resistivity. By measuring changes in the electrical characteristic of the wire (i.e., the sensor response of the wire), a computing system can determine the current gesture or deformation of the controller. For example, if the deformable controller is a humanoid, raising the arm of the controller causes a corresponding sensor response in a piezoelectric wire extending through the arm of the controller which is measured by a computing system. The computing system may use a predefined mapping function to map the sensor response of the wire to a particular deformation being made by the controller. The computing system may perform different actions depending on which deformation is detected—e.g., raising a foot of the controller causes a displayed model to kick while raising the arm of the controller causes the model to wave.

Identifying where to place the piezoelectric material in the controller is difficult. Although a user can make an educated guess where to place the piezoelectric material based on the types of gestures or deformations she wants to detect, the accuracy of the mapping used to translate the sensor responses of the piezoelectric material to different controller deformations vary widely based on the chosen location of the piezoelectric material. Embodiments herein describe design techniques for optimizing the placement of the piezoelectric material in the controller to improve the accuracy of the mapping function that maps sensor responses of the piezoelectric material to different controller deformations. In one embodiment, the user can use a simulator to specify the different deformations of the controller she wishes to be recognized by the computing system (e.g., raising a leg, twisting a torso, squeezing a hand, etc.). Using 3D markers that indicate the location of the controller when performing the user-defined deformations, a design optimizer adjusts the location of the piezoelectric material in the controller such that the sensor response of the material better maps to the 3D markers. Stated differently, the design optimizer uses the locations of the deformations desired by the user to move the location of the piezoelectric material such that the sensor response of the material can be uniquely mapped to these locations. In other embodiments, the controller may include multiple piezoelectric wires whose locations are optimized such that their sensor responses, when considered as a whole, map to desired deformations of the controller.

Figure 1B:
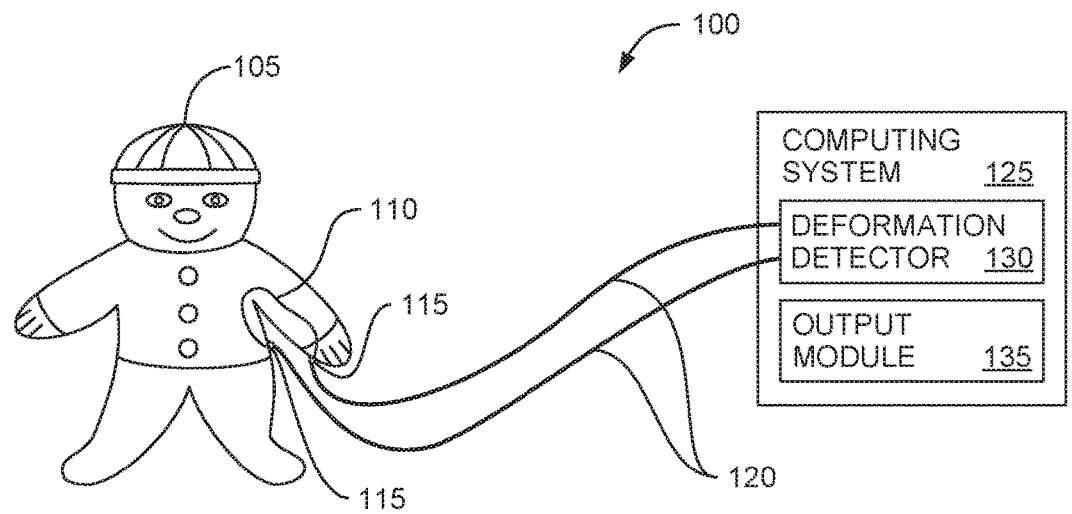

FIGS. 1A and 1B illustrate an input system 100 that includes a deformable 3D controller 105, according to embodiments described herein. The controller 105 may be made of any deformable material such as rubber, plastic, layered fabric, etc. In one embodiment, the controller 105 may be formed using a 3D printer, but this is not a requirement. For example, the techniques described herein could be used with a controller 105 formed from a mold where piezoelectric material is disposed on or in the controller 105.

As shown, the controller 105 includes a piezoelectric wire 110. It is assumed that the piezoelectric wire 110 extends through the interior of the controller 105 rather than being disposed on a surface of the controller 105 although either arrangement is possible. In one embodiment, the controller 105 may be split in half along a plane parallel to the plane of FIG. 1 which permits the piezoelectric wire 110 to be disposed within the controller 105, after which the two halves are reattached to each other. If the controller has multiple wires 110, the controller may be split at different planes where each wire 110 is disposed in its own plane. The planes can then be reattached so that the wires 110 are on different planes and can have different orientations and locations. However, in another embodiment, the controller 105 and the piezoelectric wire 110 may be formed during a single 3D printing process where the 3D printer uses a piezoelectric material to form the wire 110 but use a different material for the rest of the controller 105 which may be insulative and deformable.

The input system 100 includes a computing system 125 coupled to the piezoelectric wire 110 in the controller 105 via connectors 115 and wires 120. Specifically, the computing system 125 includes a deformation detector 130 that captures the sensor response of the piezoelectric wire 110. As a user (or other actor) manipulates the deformable controller 105, this physical deformation causes the piezoelectric wire 110 to stretch or compress thereby changing its sensor response. For example, changing the physical characteristics of the piezoelectric wire 110 may cause its electrical resistivity to change. The deformation detector 130 can track the change in the sensor response of the piezoelectric wire 110—e.g., a change in resistance, voltage, and/or current. Using a mapping function, the deformation detector 130 can map the sensor response of the wire 110 to different predefined deformations or gestures of the controller 105. In one embodiment, deforming the controller 105 (e.g., bending a flexible arm) also deforms the piezoelectric wire 110. However, in other embodiments, piezoelectric wire 110 can be deformed without deforming the material of the controller 105. For example, the controller 105 may include a ball and socket arm joint that permits the user to manipulate or move an arm of the controller 105. When moving the arm, a piezoelectric wire 110 running through the joint is deformed in order to detect the gesture of the controller. Thus, as used herein "deforming the controller 105" includes moving or manipulating the controller 105 in a manner that does not necessarily physically deform the material of the controller 105. Put differently, a desired deformation can include, e.g., moving a ball and socket joint as well as bending a flexible material of the controller 105.

As shown in FIG. 1A, the controller 105 is in a state of rest where no external forces are applied to the controller 105. However, in FIG. 1B, external forces are applied by the user (or some other actor) which causes the arm of the controller 105 to bend down. This deformation changes the physical and electrical characteristics of the piezoelectric wire 110. For example, bending down the arm may cause portions of the wire 110 to compress or stretch which alters the total resistivity of the wire 110.

The deformation detector 130 tracks the change in the sensor response of the piezoelectric wire 110 caused by the deformation. For example, a first sensor response value (e.g., 1V or 50 ohms) may correspond to the controller 105 in the rest state shown in FIG. 1A, while a second sensor response value (e.g., 2V or 100 ohms) corresponds to the arm being forced down as shown in FIG. 1B. In one embodiment, the deformation detector 130 uses the mapping function to translate the sensor response of the wire 110 into physical locations of the controller 105 (e.g., the location of the right arm is in space) which then can be correlated to a specific predefined deformation or gesture. In this case, the deformation detector 130 uses the sensor response of the wire 110 and the predefined mapping function to determine that the arm is moved down as shown in FIG. 1B.

Once a predefined deformation is identified, the deformation detector 130 informs an output module 135 of the particular deformation of the controller 105. In response, the output module 135 performs one or more actions corresponding to the particular gesture. For example, if the deformation detector 130 determines the user has lowered the arm of the controller 105, the output module 135 may cause a displayed visual model to also lower its arm. Stated differently, manipulating the controller 105 in the real world causes a displayed model of the controller 105 to perform the same or similar action. Using the deformation detector 130 and output module 135, a user can manipulate the controller 105 to control a character in, e.g., a video game or animation tool to mirror the deformations of the controller 105. Of course, other actions are possible such as using predefined deformations of the controller 105 to turn off lights, start a car, open a software application, and the like.

Figure 2:
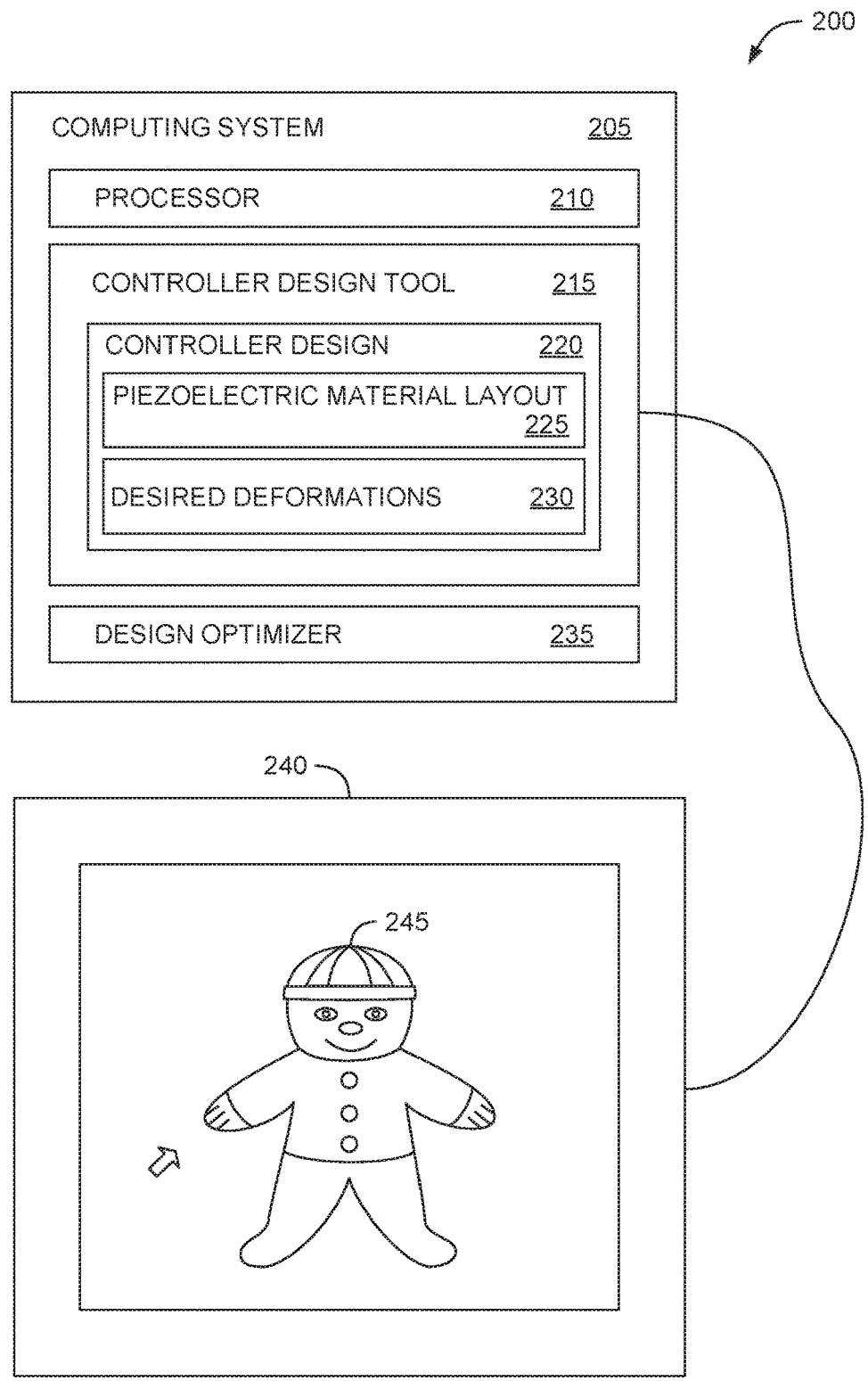
FIG. 2 is a computing system for designing a deformable 3D controller, according to embodiments described herein.

FIG. 2 is a system 200 for designing a deformable 3D controller, according to embodiments described herein. System 200 can be used to design a 3D controller that performs the function of the controller 105 shown in FIGS. 1A and 1B. The system 200 includes a computing system 205 and a display device 240. The computing system 205 includes a processor 210 that represents one or more processing elements that may each include one or more processing cores. The processor 210 may be used to perform the functions described below.

The computing system 205 also includes a controller design tool 215 (e.g. a software application or simulator)

which helps a user to design a deformable, physical controller which includes piezoelectric material (e.g., piezoelectric wires) that can be used to detect predefined deformations or gestures as described above. Using the design tool 215, a user can generate a controller design 220 which, in one embodiment, includes the necessary information for forming the physical controller using, e.g., a 3D printer or a mold. That is, the controller design 220 includes the necessary parameters for generating a physical deformable controller.

As shown, the design 220 includes a piezoelectric material layout 225 that indicates where in the design 220 the piezoelectric material should be disposed. Using controller 105 in FIG. 1A as an example, the piezoelectric material layout 225 would indicate where in the controller 105 the wires 110 should be located. The embodiments that follow describe using the controller design tool 215 and a design optimizer 235 to optimize the location of the piezoelectric material layout 225.

The design 220 also includes desired deformations 230. In one embodiment, the user can manipulate a model 245 of the controller displayed on the device 240. That is, the user may use one or more input/output devices (e.g., a mouse, stylus, keyboard, etc.) to generate the model 245. The size, shape, color, and dimensions of the model 245 may then be used to generate the controller design 220. Put differently, the user can generate the model 245 which the controller design tool 215 then uses to create the controller design 220. In addition to generating the look and dimensions of the controller using the model 245, a user can manipulate the model 245 to indicate to the design tool 215 which deformations should be detected using the controller (referred to as "desired deformations" 230) or the deformations can be simulated by the design tool 215 using a model of the controller (i.e., the controller design 220) and the material of the controller. For example, the design tool 215 may simulate the model raising and lowering the arms, kicking the legs, twisting the torso, and bending the head to be desired deformations that are detectable by a computing system measuring the sensor response of the piezoelectric material in the controller.

The user may manipulate the model 245 to input the desired deformations 230 to the controller design tool 215. That is, the user may raise the arm of the model 245 from a rest state (e.g., a first pose) to a deformed state (e.g., a second pose). In one embodiment, the design tool 215 identifies 3D markers on the surface of the model 245 and tracks the locations of the markers when performing the desired deformation 230. As described below, the 3D markers, or more specifically, the locations of the markers when performing the desired deformation 230 are used to optimize the piezoelectric material layout 225. Using the display device 240 and model 245, the user can provide any number of desired deformations 230 of the controller that the user wants to cause a corresponding action in a computing system measuring the sensor response of the piezoelectric material.

The computing system 205 includes a design optimizer 235 (e.g. a software application) which receives the desired deformations 230 captured by the design tool 215 and optimizes the piezoelectric material layout 225. Stated generally, the design optimizer 235 adjusts the location of the piezoelectric material in the controller design 220 to improve the ability of a computing system to detect the desired deformations 230 from the sensor responses of the piezoelectric material.

Figure 3:
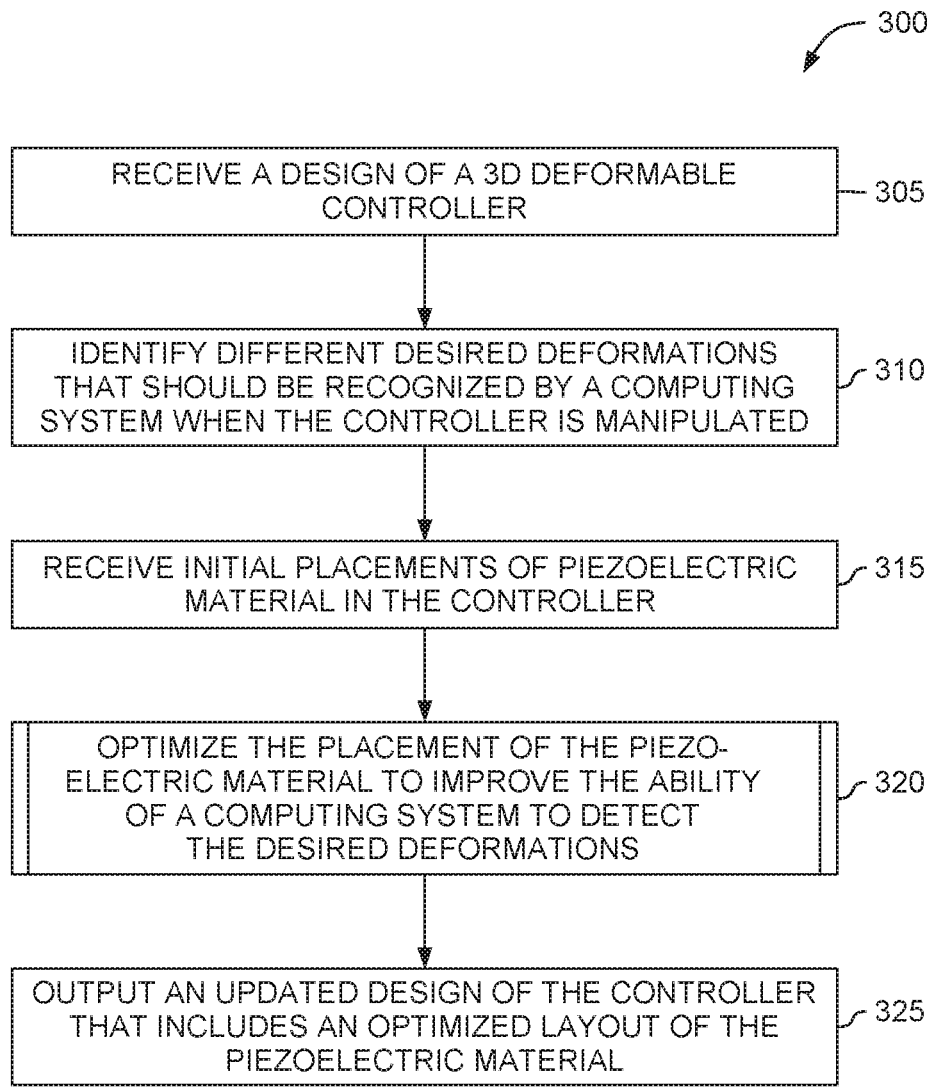
FIG. 3 is a flowchart for designing the deformable 3D controller, according to embodiments described herein.

FIG. 3 is a flowchart of a method 300 for designing the deformable 3D controller, according to embodiments described herein. At block 305, the controller design tool receives a design of a 3D deformable controller. In one embodiment, the user generates a model of the controller as shown in FIG. 2 which can be used to determine the size, dimensions, shape, and color of the controller as well as the material of the controller. Furthermore, because multi-material 3D printers can print models of varying softness, the model may indicate the controller will be made of material that has properties that vary spatially. In another embodiment, the design may be selected from a list of potential controller shapes. For example, a user may use a selection process to indicate the tasks she wishes to perform using the controller, and based on that information, the design tool selects one of a plurality of predefined controller designs.

At block 310, the design tool identifies at least one desired deformation that should be recognized by a computing system when manipulating the controller. In one embodiment, the desired deformations are provided by the user who manipulates the model of the controller in order to illustrate what deformations should be detected. One example of a user manipulating a model to generate a desired deformation is shown in FIG. 4 which illustrates different stages of designing the deformable 3D controller.

Figure 4:
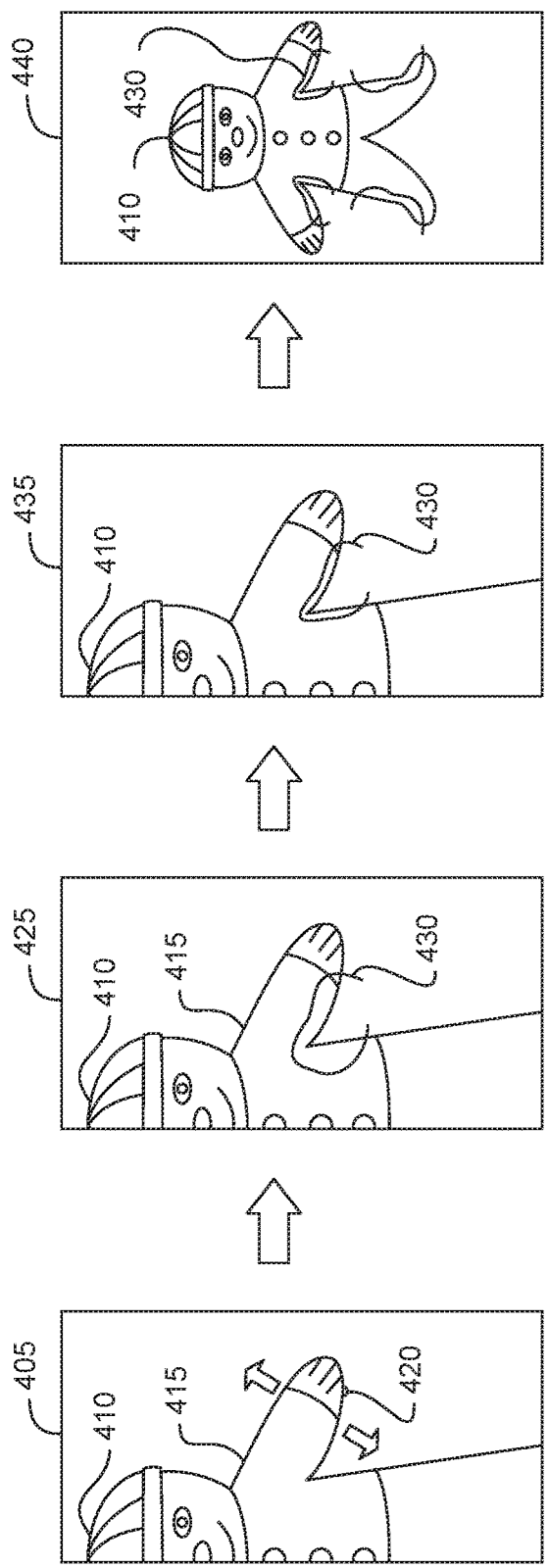
FIG. 4 illustrates different stages of designing the deformable 3D controller, according to embodiments described herein.

Image 405 in FIG. 4 illustrates a model 410 that is displayed to a user on a display device. Although a humanoid shape is shown, the model 410 may be any kind of object suitable for a deformable controller. To generate the desired deformation, the user may inform the design tool that the current state of the model 410 is the rest state of the controller. Using an I/O device, the user may grab and move the arm 415 of the humanoid model 410 from the rest state (e.g., a first, default pose) to a deformed state (e.g., a second pose). As shown, the user manipulates the arm 415 to cause the arm 415 to raise and lower. When the arm is at the desired deformed state, the user may inform the design tool thereby indicating to the design tool the desired deformation. The user may both lower and raise the arm to generate two desired deformations: an arm raise deformation and an arm lower deformation. Based on the user input, the design tool can determine the location of the arm 415 in the deformed state relative to its rest state. In this embodiment, the design tool sets a 3D marker 420 at a particular location on the surface of the arm 415 and tracks how the location of the 3D marker 420 changes when the arm 415 moves between the rest state and a maximum deformed state defined by the user.

Alternatively, the user may select a controller that comes prepackaged with various deformations. For example, if the user selects a controller shaped like a running shoe, bending the shoe may be a desired deformation which causes a model to begin to run. However, squeezing the shoe may be another deformation which causes the model to stop. These deformations may already be associated with the controller before the user selects the controller from a library. Thus, the locations of the 3D markers 420 between the rest state and the deformed state for each of the deformations have already been determined. However, the user may also specify additional desired deformations using the system shown in FIG. 2.

Returning to method 300, at block 315, the design tool receives initial placements of piezoelectric material in the controller. For example, if the piezoelectric material is a piezoelectric wire, the user may first draw curves in the model 245 in FIG. 2 indicating an initial guess where the wires should go in order to detect the desired deformation. One example of this is shown in image 425 of FIG. 4 where the user has placed a piezoelectric wire 430 in the arm 415 of the model 410. As shown, the wire 430 forms a curve (or path) as it traverses through the arm 415.

In other embodiments, the design tool may not rely on the user to provide the initial placement of the piezoelectric wire 430 in the model 410 representing the controller. For example, the design tool may include an algorithm that evaluates the parts of the model 410 that move or flex when the user performs the desired deformations as shown in image 405. The design tool may place the wire 430 near the portions of the model 410 most affected when performing the desired deformations. However, permitting the user to place the wire 430 initially may be desired if the user is an expert in this field, and thus, the user's expertise can be leveraged to speed up or improve the optimization process described at block 320. Furthermore, to aid the user when placing the piezoelectric wire 430, the design tool may display the portions of the model 410 most affected when performing the desired deformations using, e.g., vectors or colors which change depending on the extent of the motion or flex of the model 410 when performing the desired deformation.

Although image 425 illustrates placing only one piezoelectric wire 430, in other embodiments, the model 410 may include several wires. For example, to better detect desired deformations of a left arm (not shown in image 425), the user may place a separate piezoelectric wire in the left arm of the model. Thus, a physical controller can include multiple piezoelectric wires that a computing system can monitor to detect different deformations—e.g., a left arm raise versus a right arm raise. The design tool can rely on the user to initially determine how many separate piezoelectric wires the controller should include and where those wires should be located, or the tool can select the number and location of the wires automatically.

At block 320, the design optimizer optimizes the placements of the piezoelectric material to improve the ability of a computing system to detect the desired deformations relative to the initial placement of the piezoelectric material. In one embodiment, the design optimizer uses the 3D markers or locations of the controller when in the deformed state to determine if the current location of the piezoelectric wire outputs a sensor response that can be accurately mapped to the 3D marker. That is, the design optimizer determines whether the calculated locations (e.g., 3D coordinates) derived from the simulated sensor response of the piezoelectric wire and the mapping function are within a threshold error value to the location of the markers when desired deformations were identified at block 310. If not, the design optimizer moves the location of the piezoelectric wire as shown in image 435 of FIG. 4 and again determines if the sensor response can be accurately mapped to the locations of the markers when the user performed the desired deformations at block 310 (referred to herein as goal locations). Moreover, in addition to altering the location of the piezoelectric wires, the design optimizer may also optimize the mapping functions that map the sensor responses to different deformations. The details of block 320 are described in more detail in method 500.

In one embodiment, the design optimizer adjusts the placement of all the piezoelectric wires in parallel since the computing system attached to the wires may consider the sensor responses as a whole when identifying the different deformations. Once the design optimizer identifies the optimized locations of the piezoelectric wires in the model, the design optimizer provides the finalized piezoelectric material layout to the design tool. However, if a reconstruction error remains above a threshold, the wire curves can be edited (e.g., extended) by the user or new wires can be added. The method 300 may repeat until the error is within a user-specified distance from the target marker positions (as discussed below). Image 440 in FIG. 4 provides a zoomed out view of the model 410 that illustrates the optimized locations of four piezoelectric wires in the model 410. Using four separate piezoelectric wires may be preferred rather than a single wire that extends through the legs and arms.

At block 325, the design tool outputs an updated design of the controller that includes the optimized layout of the piezoelectric material. The controller design is then used to fabricate the physical controller. For example, the design may be inputted to a 3D printer that forms the controller using a deformable material. In one embodiment, the 3D printer prints the entire controller, including the piezoelectric material. For example, the 3D printer may dispose piezoelectric material in the position of the wires shown in image 440 of FIG. 4. By switching materials, a single 3D printer can form both the piezoelectric material as well as the surrounding deformable material. However, current 3D printers may not be capable of printing piezoelectric material with enough precision to match the design outputted by method 300. For example, due to shortcomings in 3D printers, the sensor response of the piezoelectric material may not match the simulated sensor response calculated using method 300. As such, instead of using a 3D printer to form both the deformable and piezoelectric material in the controller, the 3D printer (or any other suitable process) is used to form only the deformable material portion of the controller. For example, the 3D printer may print two halves of the controller and leave channels in each half indicating the positions of the piezoelectric wires as indicated by the piezoelectric material layout in the controller design. The user can then place the piezoelectric wires in the channels before sandwiching the wires between the two halves. In another embodiment, the 3D printer may print multiple layers of the controller and leave channels in each layer indicating a position of at least one of the piezoelectric wires such that each one of the four wires is disposed on a different plane. The planes can have a different location and orientation relative to the other planes forming the controller. In this manner, the controller is formed using a multiple step process based on the design outputted by method 300.

Figure 5:
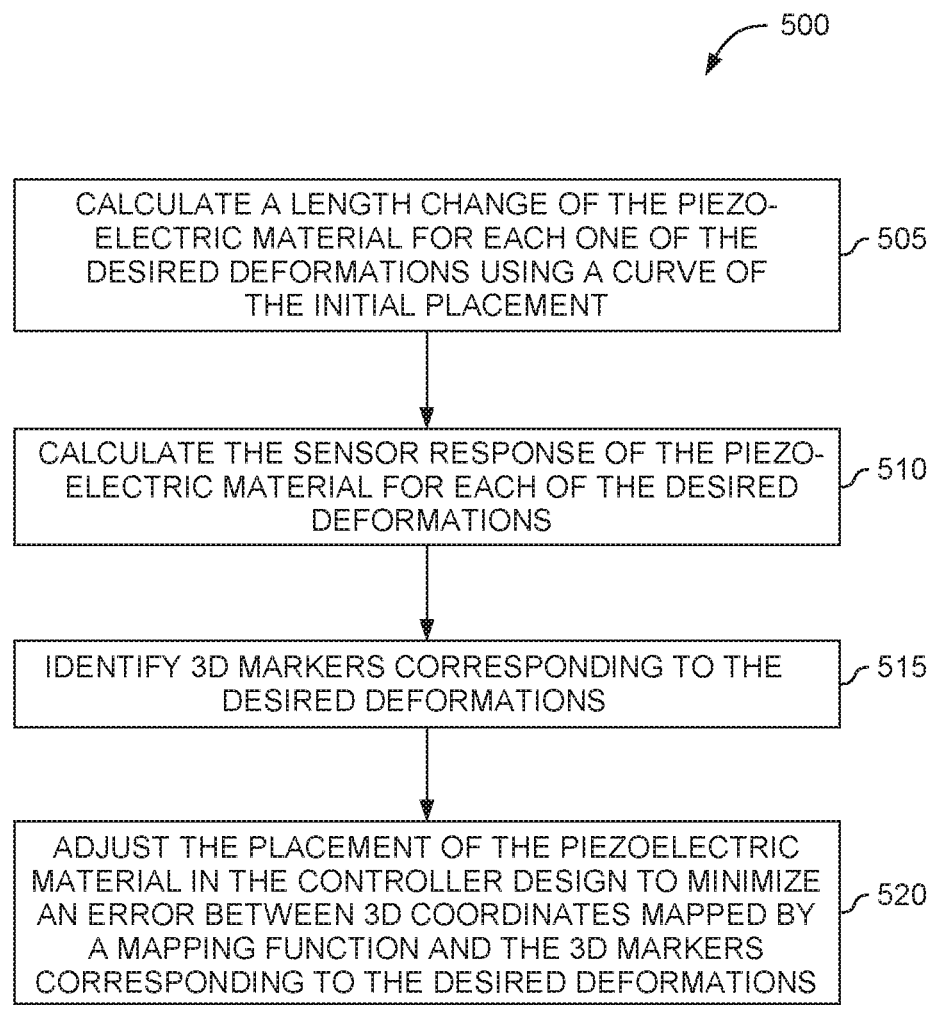
FIG. 5 is a flowchart for adjusting the location of piezoelectric material in the deformable 3D controller, according to embodiments described herein.

FIG. 5 is a flowchart of method 500 for adjusting the location of piezoelectric material in the deformable 3D controller, according to embodiments described herein. Specifically, method 500 illustrates various blocks that may be performed during block 320 of FIG. 3 when optimizing the placement of the piezoelectric material in the controller.

At block 505, the design optimizer calculates a length change of the piezoelectric material caused by each one of the desired deformations using a curve of the initial placement when the controller is in the rest state. Stated differently, the design optimizer identifies a curve (C) which tracks the path of the piezoelectric material through the controller identified at block 315 of FIG. 3. Though the curve or path of the material may be decided initially by the user, this is not a requirement.

Using image 425 of FIG. 4 as an example, when the arm 415 is manipulated to perform one of the desired deformations shown in image 405, this results in a force on the piezoelectric wire 430 which may stretch some portions of the wire 430 but compress other portions. The localized changes in the wire 430 cause an overall change in the length of the wire 430—i.e., cause the overall length to increase or decrease. This change in the length of the wire 430 is independent of the material and the mode of the controller used for fabrication and simulation, and thus, method 500 may be used with any simulator or controller material. When moving the controller from a rest state to a deformed state of one of the desired deformations, the overall change in length can be represented by Equation 1.

$$\Delta l = \int_C \varepsilon(\gamma) d\gamma \quad (1)$$

In Equation 1, $\Delta l$ is the overall change in length, C is the curve or path of the wire 430 in the controller, and $\varepsilon(\gamma)$ is the Cauchy strain which measures compression and stretching at a particular location, given a deformation. The design optimizer uses Equation 1 to calculate the length change each of the desired deformations cause on one of the wires. This process is repeated for each piezoelectric wire in the controller. For example, if there are five wires in the controller and four desired deformations, the design optimizer calculates four different length change values for each of the five wires.

At block 510, the design optimizer calculates the sensor response of the piezoelectric material for each of the desired deformations. Piezoelectric materials generally exhibit a deformation dependent resistivity that is often close to linear even for large deformations. In Equation 2, this change in resistivity is modeled as a linear function.

$$w(\varepsilon) = k_{res} \times \varepsilon \quad (2)$$

In Equation 2, the coefficient $k_{res}$ is obtained by a calibration procedure using a dedicated specimen. The total signal change (i.e., sensor response) caused by performing one of the desired deformations of the sensor is shown in Equation 3.

$$s(C) = \int_C w(\varepsilon) \quad (3)$$

In Equation 3, the curve (C) or path of the piezoelectric wire is discretized into a plurality of sub-portions. Equation 3 can then be used to identify the changes in sensor response caused by each of the sub-portions being stretched or compressed by performing the desired deformation. The design optimizer can use Equation 3 to identify the sensor responses corresponding to each of the piezoelectric wires for each of the desired deformations. Thus, if there are four desired deformations and five wires, the design optimizer calculates four different sensor responses (s(C)) for each of the wires.

At block 515, the design optimizer identifies 3D markers corresponding to the desired deformations. As mentioned above, when the user moves a model to instruct the design tool what deformations are desired, the design tool may track the locations of 3D markers on the model's surface. These goal locations may be 3D coordinates indicating how the surface of the model moves between the rest state and the deformed stated when performing the desired deformation. Stated differently, the design tool tracks markers on the surface of the controller to determine how the markers change position in space when performing the desired deformations. For example, although the model 410 in image 405 of FIG. 4 includes only one 3D marker 420 on the arm 415, in other embodiments, the design tool may track tens or hundreds of markers on the arm 415 to capture how the arm 415 moves when performing the deformation. The design tool then transmits the locations of the 3D markers when performing the desired deformations to the design optimizer.

At block 520, the design optimizer adjusts the placement of the piezoelectric material in the controller design to minimize an error between 3D coordinates derived by the sensor responses and the goal locations of 3D markers determined when the desired deformations were identified. Equation 4 represents the mapping between a sensor response of a wire and particular location on the controller.

$$f(s_i, \beta^j) = p_i^j \quad (4)$$

In Equation 4, $s_i$ is the sensor response for a particular deformation indexed by i, $\beta^j$ is the mapping weight for a particular coordinate of a 3D location (e.g., x, y, or z coordinate of a marker), and $p_i^j$ represents the resulting location of the marker after the deformation is performed—i.e., when the controller is in the deformed state. Given a deformation i and a 3D marker j, the mapping function $f$ takes a signal vector $s_i$ that collects the signals from all wires, and an unknown mapping parameter $\beta^j$ and outputs the 3d location of marker j on the deformed surface. Put differently, Equation 4 represents using the sensor response (s) and the mapping function ($f$) to track the location of a particular marker on the surface of the controller as a deformation is performed. For n number of 3D marker locations, the index j iterates over all the 3D coordinates.

In one embodiment, the design optimizer minimizes the error between the calculated locations generated by Equation 4 and the goal locations of the 3D markers found when the user provided the desired deformations. Stated differently, because the design optimizer already knows the goal locations of the 3D markers when performing the desired deformations (which were captured when the user performed the desired deformations at block 310 of method 300), the optimizer can adjust the location of the piezoelectric material (thereby changing its response) to minimize the error between the calculated locations of the markers ($p_i^j$) derived in Equation 4 and the goal locations of the markers. Equation 5 illustrates one technique for optimizing the placement of the piezoelectric material to minimize this error.

$$g(p, \beta) = \Sigma_i \Sigma_j \|f(s_i(p), \beta^j) - q_i^j\|^2 + R \quad (5)$$

Equation 5 sums the differences of reconstructed and target marker positions for all deformations and markers. The additional term can be called a regularization term (R). To minimize Equation 5, the design optimizer can use a standard Newton-type solver which adjusts the location parameter pp of the piezoelectric material in order to cause a change in the sensor response of the material. Moreover, minimizing the error in Equation 5 can also optimize the mapping parameters $\beta$. That is, the design optimizer can simultaneously optimize the location of the piezoelectric material and the mapping function used to map sensor responses to locations of markers on the surface of the controller.

In one embodiment, method 500 generates a mapping function for each marker or point of interest on the controller. Thus, each marker on the controller has a corresponding mapping parameter used to identify its location as the controller is deformed. For example, if there are five different piezoelectric wires in the controller and one hundred different markers used when designing the controller, the design optimizer outputs one hundred different mapping parameters—one for each marker. Using the five sensor responses of the wires, a computing system can use Equation 4 and the mapping function to determine the current location of a corresponding point on the surface of the controller. This calculation can be repeated using the same five sensor outputs with the other ninety-nine mapping functions to identify the current location of all the markers or points of interests on the controller. From these points, a computing system can determine the current deformation (if any) of the controller and determine if the current deformation matches the desired deformations provided at block 310 of method 300. If so, the computing system may perform a corresponding action as described above such as moving a virtual character in a game, turning on/off a light, and the like.

Once the placement of the piezoelectric material and the mapping functions are optimized, the resulting controller design can be used to fabricate a physical 3D controller. When the piezoelectric material is electrically coupled to a computing system, the computing system uses the sensor responses of the piezoelectric material along with the mapping functions to identify locations of the markers (i.e., points at the surface of the controller) in space. The computing system can then use these locations to determine the gesture or deformation of the physical controller. Furthermore, the computing system can identify continuous motion or different stages of deformation. For example, as the sensor responses change, the computing system can use the mapping functions to identify a range of motions—e.g., as the user raises an arm of the controller from a rest state to a maximum deformed state. The computing system can determine when the arm is quarter of the way to the maximum deformed state, half way to the maximum deformed state, three quarters of the way to the maximum deformed state, etc.

In one embodiment, the physical controller is calibrated to adjust the mapping functions derived by the optimization model when designing the controller. For example, optical transmitters can be placed at the marker positions on the controller which are then tracked using a detection system as the physical controller is deformed. If the locations of the of the transmitters match the locations outputted using the sensor responses and the mapping functions, then the controller is accurately calibrated. However, if the locations do not match, a calibration apparatus may adjust the mapping functions to provide outputs that match the tracked location of the optical transmitters.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the controller design tool) or related data available in the cloud. For example, the controller design tool and design optimizer could execute on a computing system in the cloud to identify the optimized layout of the deformable material and the piezoelectric material in the controller. In such a case, the design tool could use cloud computing resources to store the controller design at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving a design of a deformable controller;
identifying a desired deformation of the controller where at least a portion of the controller changes from a first pose to a second pose;
determining an initial path for each of a plurality of piezoelectric wires in the design of the controller;
identifying a plurality of goal locations of the controller by tracking a plurality of markers on a surface of the controller as the controller performs the desired deformation, wherein each of the plurality of goal locations corresponds to a respective one of the plurality of markers;
calculating a simulated sensor response for each of the plurality of piezoelectric wires for the desired deformation;
calculating, using a plurality of mapping functions, a plurality of calculated locations of the controller based on the simulated sensor response for each of the plurality of piezoelectric wires, wherein each of the plurality of calculated locations corresponds to a respective one of the plurality of markers;
calculating an error between respective ones of the plurality of goal locations and the plurality of calculated locations;
updating the plurality of mapping functions by successively adjusting, using one or more computing processors, the path of each of the plurality of piezoelectric wires in the design based on the calculated error between respective ones of the plurality of goal locations and the plurality of calculated locations, wherein each of the plurality of updated mapping functions corresponds to a respective one of the plurality of markers; and
fabricating a physical controller based on an updated design comprising the adjusted path of each of the plurality of piezoelectric wires.

2. The method of claim 1, wherein the plurality of updated mapping functions are configured to output respective locations of markers on a surface of the controller in space based on the simulated sensor responses.

3. The method of claim 1, wherein adjusting the path of each of the plurality of piezoelectric wires in the design comprises:
before adjusting the path of each of the plurality of piezoelectric wires, calculating a simulated length change of the path of each of the plurality of piezoelectric wires caused by the desired deformation.

4. The method of claim 3, wherein the simulated sensor response for each of the plurality of piezoelectric wires is based on the simulated length change of each of the plurality of piezoelectric wires caused by the desired deformation.

5. The method of claim 1, wherein the path of at least one of the plurality of piezoelectric wires extends through an interior portion of the design of the controller.

6. A non-transitory computer-readable storage medium for designing a deformable controller, the non-transitory computer-readable storage medium comprising:
computer-readable program code, when executed by a processor, operable to:
receive a design of the deformable controller;
identify a desired deformation of the controller where at least a portion of the controller changes from a first pose to a second pose;
determine an initial path of each of a plurality of piezoelectric wires in the design of the controller;
identify a plurality of goal locations of the controller by tracking a plurality of markers on a surface of the controller as the controller performs the desired deformation, wherein each of the plurality of goal locations corresponds to a respective one of the plurality of markers;
calculate a simulated sensor response for each of the plurality piezoelectric of wires for the desired deformation;
calculate, using a plurality of mapping functions, a plurality of calculated locations of the controller based on the simulated sensor response for each of the plurality of piezoelectric wires, wherein each of the plurality of calculated locations corresponds to a respective one of the plurality of markers;
calculate an error between respective ones of the plurality of goal locations and the plurality of calculated locations;
update the plurality of mapping functions by successively adjusting, using one or more computing processors, the path of each of the plurality of piezoelectric wires in the design based on the calculated error between respective ones of the plurality of goal locations and the plurality of calculated locations, wherein each of the plurality of updated mapping functions corresponds to a respective one of the plurality of markers; and
generate instructions to fabricate a physical controller based on an updated design comprising the adjusted path of each of the plurality of piezoelectric wires.

7. The non-transitory computer-readable storage medium of claim 6, wherein the plurality of updated mapping functions are configured to output respective locations of markers on a surface of the controller in space based on the simulated sensor responses.

8. The non-transitory computer-readable storage medium of claim 6, wherein adjusting the path of each of the plurality of piezoelectric wires in the design comprises:
before adjusting the path of each of the plurality of piezoelectric wires, calculating a simulated length change of the path of each of the plurality of piezoelectric wires caused by the desired deformation.

9. The non-transitory computer-readable storage medium of claim 8, wherein the simulated sensor response for each of the plurality of piezoelectric wires is based on the simulated length change of each of the plurality of piezoelectric wires caused by the desired deformation.

10. The non-transitory computer-readable storage medium of claim 6, wherein the path of at least one of the plurality of piezoelectric wires extends through an interior portion of the design of the controller.

11. A computing system, comprising:
one or more computing processors;
a memory storing a program, wherein the program, when executed using the one or more processors, performs an operation comprising:
receiving a design of a deformable controller;
identifying a desired deformation of the controller where at least a portion of the controller changes from a first pose to a second pose;
determining an initial path of each of a plurality of piezoelectric wires in the design of the controller;
identifying a plurality of goal locations of the controller by tracking a plurality of markers on a surface of the controller as the controller performs the desired deformation, wherein each of the plurality of goal locations corresponds to a respective one of the plurality of markers;
calculating a simulated sensor response for each of the plurality piezoelectric of wires for the desired deformation;
calculating, using a plurality of mapping functions, a plurality of calculated locations of the controller based on the simulated sensor response for each of the plurality of piezoelectric wires, wherein each of the plurality of calculated locations corresponds to a respective one of the plurality of markers;
calculating an error between respective ones of the plurality of goal locations and the plurality of calculated locations;
updating the plurality of mapping functions by successively adjusting the path of each of the plurality of piezoelectric wires in the design based on the calculated error between respective ones of the plurality of goal locations and the plurality of calculated locations, wherein each of the plurality of updated mapping functions corresponds to a respective one of the plurality of markers; and
generating instructions to fabricate a physical controller based on an updated design comprising the adjusted path of each of the plurality of piezoelectric wires.

12. The computing system of claim 11, wherein the plurality of updated mapping functions are configured to output respective locations of markers on a surface of the controller in space based on the simulated sensor responses.

13. The computing system of claim 11, wherein adjusting the path of each of the plurality of piezoelectric wires in the design comprises:
before adjusting the path of each of the plurality of piezoelectric wires, calculating a simulated length change of the path of each of the plurality of piezoelectric wires caused by the desired deformation.

14. The computing system of claim 13, wherein the simulated sensor response for each of the plurality of piezoelectric wires is based on the simulated length change for each of the plurality of piezoelectric wires caused by the desired deformation.

* * * * *

UNITED STATES PATENT AND TRADEMARK OFFICE
CERTIFICATE OF CORRECTION

| | |
|---|---|
| PATENT NO. | : 10,399,327 B2 |
| APPLICATION NO. | : 15/135955 |
| DATED | : September 3, 2019 |
| INVENTOR(S) | : Moritz Niklaus Bacher et al. |

Page 1 of 1

It is certified that error appears in the above-identified patent and that said Letters Patent is hereby corrected as shown below:

In the Specification

In Column 11, Lines 32-33, delete "of the of the" and insert -- of the --, therefor.

In the Claims

In Column 15, Line 23, in Claim 6, delete "piezoelectric of wires" and insert -- of piezoelectric wires --, therefor.

In Column 16, Line 23, in Claim 11, delete "piezoelectric of wires" and insert -- of piezoelectric wires --, therefor.

Signed and Sealed this
Twelfth Day of November, 2019

Andrei Iancu
*Director of the United States Patent and Trademark Office*